United States Patent Office 3,492,550
Patented Jan. 27, 1970

3,492,550
APPARATUS FOR COMPENSATING RECORDED PHASE MODULATED CONTROL SIGNALS FOR USE IN A MULTIAXES SERVO
Reno V. Benaglio, Bloomfield Hills, Mich., assignor to The Bendix Corporation, a corporation of Delaware
Filed Apr. 28, 1967, Ser. No. 634,759
Int. Cl. G05b 19/12
U.S. Cl. 318—18                                6 Claims

ABSTRACT OF THE DISCLOSURE

The application discloses a position control system operative in response to coded information on an input tape. A controller generates a number of pulse trains, one for each axis of position control required, in response to tape coding. The pulse trains are each converted into command square waves which are phase shifted with respect to a common reference square wave as a function of the information coded in the pulse train. The phase shifted command signals and the reference signal are recorded for later playback at a machine control unit. Deviations in the reference signal frequency as a result of the recording and playback process tend to introduce apparent additional phase shifts between the played back reference and command signals. In order to compensate for these an error signal is generated by passing the reference signal through a filter and resolver identical to that through which the actual signals are passed, detecting the phase shift that this signal undergoes as a result of its deviation from its nominal frequency and generating an error or voltage proportional to this phase shift. The output of this error unit is algebraically added to each of the error signals to develop corrected control signals.

BACKGROUND OF THE INVENTION

Field of the invention

This invention relates to a method and apparatus for magnetically recording and playing back phase modulated control signals consisting of a control and a command signal recorded on separate tape channels, and more particularly to means for compensating for variations from their original form which are imposed on the signals in the recording and playback process.

Description of prior art

A common method of encoding control signals, particularly those employed in motion and position control systems, involves modulating the phase of a cyclical wave, such as a square wave or a sine wave, with respect to a reference wave form of constant frequency. The phase displacement of the command signal with respect to the reference signal at any instant is made proportional to the instantaneous magnitude of the control signal. It is often desirable to record such signals for playback at a later time and/or a different location. This record-playback technique may be employed in connection with numerically controlled contouring position control systems. In such systems digital information relating to a desired path for the output member of the control system, such as the cutter of the machine tool, or numerical data relating to the shape of the desired part to be formed by a macrine tool, is provided to either a general or a special purpose computer which operates on the data to provide control signals representative of instantaneous output member positions, which may take the form of command square waves phase modulated with respect to a reference square wave. These signals may be magnetically recorded for playback at the actual control unit. At the unit, the control signals are decoded and used to control a servo system which directs the path of the output member.

In one form of control unit the reference signal can be used to excite a resolver which has its shaft mechanically coupled to the member which is to be positionally controlled. The output of the resolver is a signal having a phase which is proportional to the resolver's shaft position. This resolver output is compared to the played back command signal in a demodulator in order to develop an error signal proportional to deviation of the commanded position from the actual position, which signal is used to control the application of power to the servo motor which drives the controlled member. In such a system it is often convenient to excite the resolver with a played back, or regenerated reference signal in the form of a square wave. The output of the resolver will therefor contain components of a wide range of frequencies which must be passed through a filter tuned to the frequency of the reference signal to develop a sine wave whose phase or zero crossings accurately represent the angular position of the resolver rotor. Since all passive filters are frequently sensitive to a greater or lesser degree, this filter for the output of the resolver may introduce an additional, undesirable phase shift into the resolver output if the frequency of the regenerated reference wave varies at all from its nominal frequency. The filter may be adjusted so as to introduce no phase shift at the nominal frequency, but the band width in which no phase shift occurs is inherently very limited. Any phase shift introduced by the filter will be interpreted by the discriminator as an additional command increment and will produce a proportional error in the output of the controlled member.

Deviations in the frequency of the regenerated reference signal from the original signal which cause undesirable phase shifts when passed through the resolver and filter are inherently introduced in the recording and playback process. Such errors may result from eccentricities of the recorder or playback capstans, or shrinkage or elongation of the tape caused by variations in atmospheric conditions or streeses imposed thereon. Attempts to minimize the phase shift introduced into the reference wave by the resolver and its filter as a result of deviations of the regenerated reference wave from its nominal frequency may be directed to improving the mechanical characteristics of the recording and playback process, so as to produce a regenerated reference signal without undue deviation, and by providing an improved filter which has a relatively wide band pass range in which no phase distortion is introduced, but both of these courses prove extremely expensive if the error must be reduced to a negligible amount; particularly since the filter must be designed to adequately reject odd harmonics of the carrier frequency, which are very predominant as a consequence of exciting the resolver with a *square* wave.

SUMMARY OF THE INVENTION

The present invention is directed to a method compensating the servo operation for phase shifts introduced by the resolver and its filter as a result of shift of the reference signal from its nominal frequency, which compensating method is itself low in cost and will allow the use of low cost recording and playback equipment and simple filters having relatively poor phase shift properties at frequencies other than that of the nominal reference wave. Broadly, this compensating technique consists of generating in the playback end an electrical signal having a magnitude equal to the error which is produced in the output of the demodulator by virtue of reference wave frequency shift and substracting this voltage from the output of the demodulator. The compensating voltage is obtained by passing the regenerated reference wave through a filter having identical phase shift properties to the resolver and resolver filter, and then demodulating the output of this filter with the original reference wave to obtain an error signal proportional to the deviation of the phase shift of the output of the filter-resolver pair from the phase shift which would occur if the played back command wave had the proper frequency. In a preferred embodiment of the invention, which is subsequently disclosed in detail, the resolver is excited by a pair of reference square waves phase shifted by 90° with respect to one another. In order to generate a compensating signal, one of these square waves is passed through a filter which consists of a resolver which is identical to the resolver employed as a feedback transducer and a filter which is identical to the filter through which the actual resolver output is passed. The rotor of this filtering resolver is initially adjusted so that no phase shift is produced when the input reference square wave is set at exactly the nominal frequency. Its rotor is then locked. The output of this compensating filter is detected for phase shift with respect to its input by comparing it with the other reference square wave in a detector-keyer or phase demodulator.

Other objects, advantages and applications of the present invention will be made apparent by a detailed description of a preferred embodiment of the invention. The description makes reference to the accompanying drawings in which:

FIGURE 1A is a representation of the wave shape which occurs at the output of the composite wave-former included in FIGURE 1;

The phase analog position control system with which the preferred embodiment of the invention is employed is broadly similar to that disclosed in U.S. Patent No. 3,365,705, for a "Method and Apparatus for Recording Phase Modulated Control Signals," assigned to the assignee of the present invention. That system employs means for compensating the control signal for errors introduced by skew of the recording tape with respect to the recording or playback heads. The present invention may be used with the basic system either with or without skew compensation feature.

Figure 1:
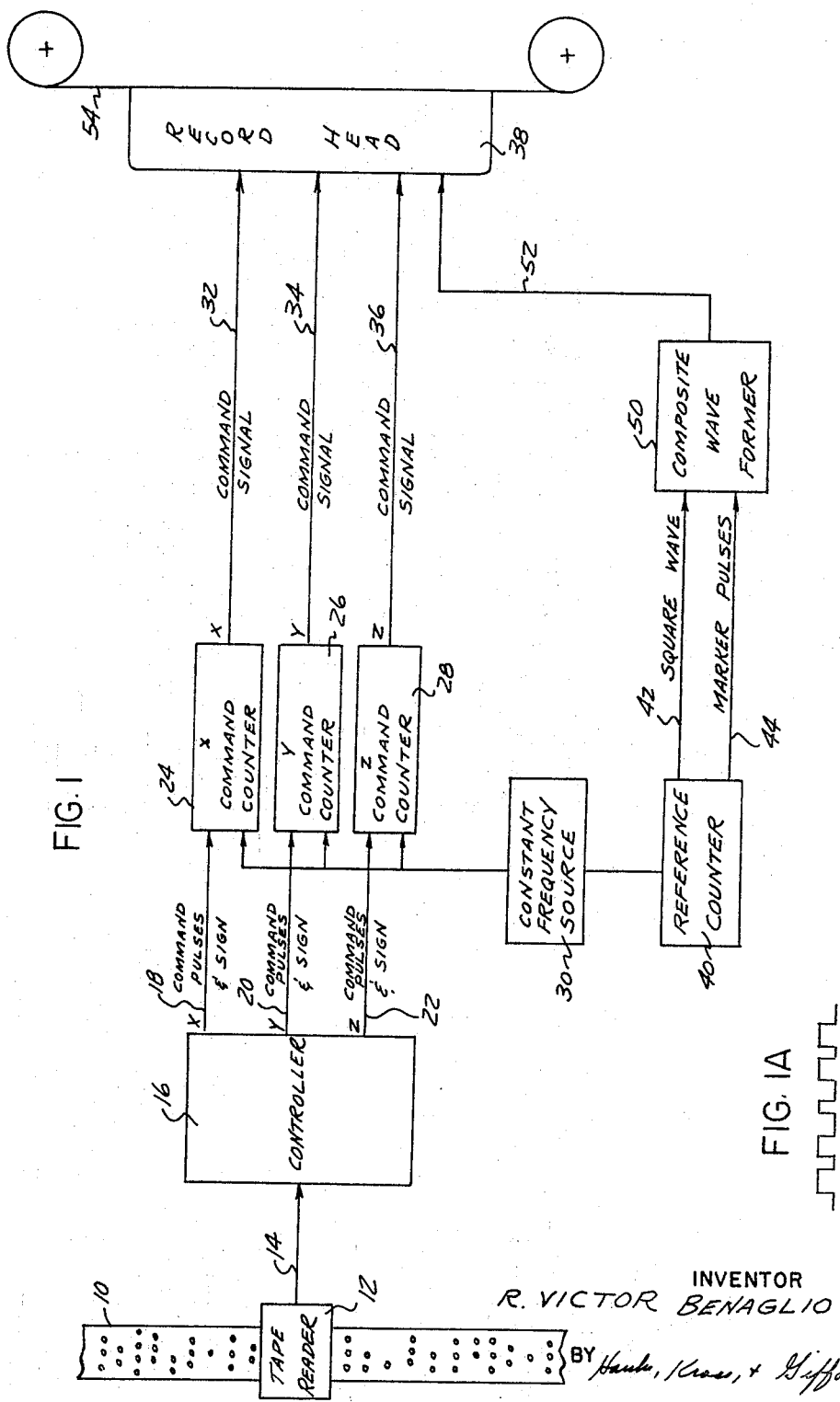
FIGURE 1 is a block diagram of the recording section of a phase analog control system useful in connection with the present invention.

Referring to the block diagram of FIGURE 1, information relating to the desired motion path of an output member is coded in digital form on a punched tape 10 which is passed through a tape reader 12 to generate a series of electrical signals representative of the coded information. These signals are transmitted on line 14 to a controller 16. The controller may be of the type disclosed in U.S. Patent No. 3,002,115. It is operative to generate a group of pulse trains, each of which is operative to control one axis of motion of the output member. In the preferred embodiment, the output member is to be driven along three mutually perpendicular axes and the controller 16 provides output or command pulse trains on lines 18, 20 and 22. In addition to the command pulse trains, these lines carry information relating to the sign of motion of the output member along each of the axes. The three command pulse train channels 18, 20 and 22 are respectively connected to X, Y and Z command counters 24, 26 and 28. These command counters may be of the general type disclosed in U.S. Patent No. 3,011,110. Each has an additional input from a constant frequency pulse generator 30. The command counters provide output pulse trains having pulse rates which are an integral divisor of the frequency of the source 30. The pulses in each of these trains are phase-displaced with respect to a reference by an amount and in a direction which is proportional to the number and sign of the pulses they receive on the lines 18, 20 and 22 from the controller 16. These phase-displaced command signals are provided on lines 32, 34 and 36 to a recording head 38.

The constant frequency pulse generator 30 also acts as an input to a reference counter 40 which divides this input pulse train by the same divisor employed in the command counters 24, 26 and 28. Its output is provided on two lines. The line 42 carries a basic reference square wave of the same frequency as the command signals on lines 32, 34 and 36. This "0 degree" square wave has not been phase-shifted in the manner of the command signals and accordingly, it acts as a reference signal, useful in determining the degree of phase shift of the command signals.

The reference counter 40 also provides an output on line 44 consisting of a square wave derived from the next to last dividing stage of the counter and thus having a frequency twice that of the "0 degree" square wave. The square waves on lines 42 and 44 are fed to a composite waveformer 50 which operates to provide an output wave which contains information from both input square waves, and is decodable, in the playback unit, to allow both square waves to be regenerated. The output from the waveformer 50 is illustrated in FIGURE 1A. It consists of the "0 degree" square wave, with short duration pulses superimposed thereon in the center of each square wave. These short pulses are of a sign opposite to that of the sign of the "0 degree" square wave at that point. The exact manner in which the waveformer 50 operates is not of importance to the present invention and described in previously referred to U.S. Patent No. 3,365,705.

The use of a composite wave-former is not necessary to the practice of the present invention, and it would be possible to record both 0 degree and 90 degree square waves individually, or the two waves might be developed from a reference signal at the playback end. However, the use of the composite wave-former has a number of advantages including the elimination of skew deviation between the two square waves on playback.

Figure 2:
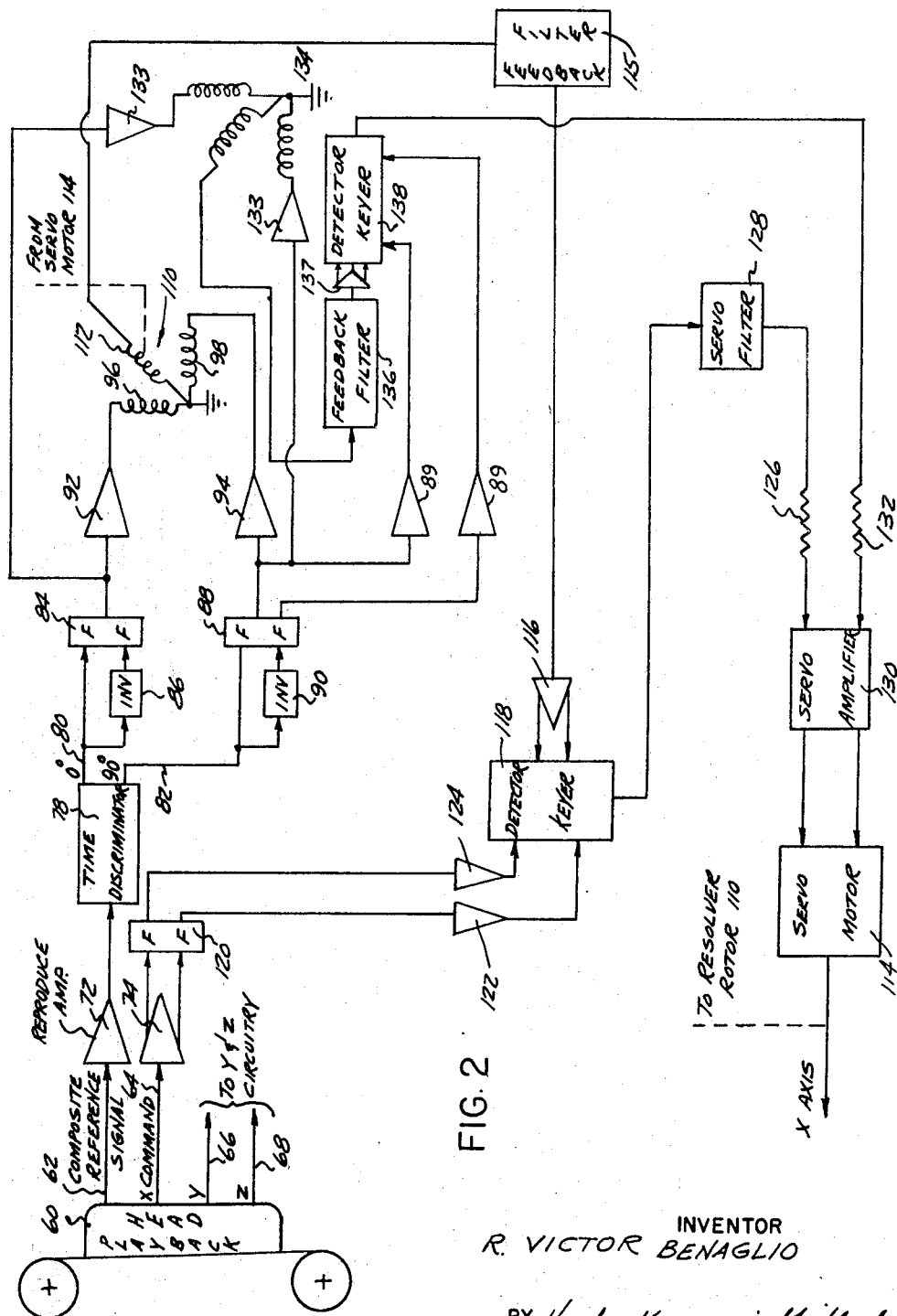
FIGURE 2 is a block diagram of the playback section of the phase analog control system embodied in the present invention.

The tape may be played back at a later time to provide appropriate control signals for the control of the output member through the circuitry of FIGURE 2. The control signals are derived from a playback head 60. The outputs of the playback head take the form of pulses occurring at the axis crossings of the square waves and marker pulses recorded by the circuitry of FIGURE 1. The composite reference signal is provided on a line 62, and the X, Y and Z command signals on lines 64, 66 and 68 respectively. The diagram of FIGURE 2 illustrates the control for a single axis. The specific Y and Z circuitry is identical to that shown for the X axis and is not disclosed. The signals 62 and 64 are fed to reproduce amplifiers 72 and 74 respectively.

The amplified output of the reproduce amplifier 72, which has the composite reference signal on line 62 as its input, is then fed to a time discriminator 78. This discriminator acts in a manner described in detail in Patent No. 3,365,705 to generate a pair of pulse trains; one, on line 80, representing the crossover points of the 0 degree square wave, and the other, on line 82, representing the crossover points of the 90° square wave.

Line 80 is fed to one of the inputs of a flip-flop 84 directly and to the other input of that flip-flop through an inverter circuit 86. Flip-flop 84 thus has as its output a square wave 90° out of phase with the square wave from flip-flop 88.

The outputs of the flip-flops 84 and 88 are fed through a pair of amplifiers 92 and 94 to the two stator coils 96 and 98 of a feedback resolver generally indicated at 110. The rotor 112 of the resolver 110 is driven by the servo motor 114 which positions a driven member along the X axis. Since the stator of the resolver 110 is energized with a square wave, the output of its rotor will be a signal in which the fundamental frequency of the square wave plus lower order odd harmonics will be present. Therefore, the output of the rotor 112 is fed to a feedback 115 which passes only the fundamental frequency of the square waves, while attenuating the third and higher order odd harmonics.

The output of this filter is fed to an amplifier 116 which generates two outputs, 180° out of phase with one another and then to a detector-keyer 118. The detector-keyer has as its other input the X command square wave as generated by a flip-flop 120 from amplifier 74. The square wave output of the flip-flop 120 is passed through two amplifiers 122 and 124 and then to the detector-keyer. The detector-keyer 118 compares the phases of its two input signals and provides an output signal constituting a voltage having a magnitude proportional to the deviation of the phase difference from an ideal 90°. Since its input signal from the amplifier 116 represents the actual position of the output member along the X axis as a function of the phase of the reference signal and the input from the amplifiers 122 and 124 constitute the desired X position as represented by the X command signal, the output of the detector-keyer 118 constitutes a voltage representing the error between the actual and command signals.

This voltage is fed through a servo filter 128 and then a servo amplifier 130 through a summing resistor 132. Servo amplifier 130 drives the servo motor 114 which positions the output member along the X axis and drives the rotor 112 of the resolver 110. The voltage applied to the servo amplifier 130 represents the sum of the voltage across the resistor 126 and a voltage applied to a second summing resistor 132. The voltage applied to resistor 132 acts to compensate for any phase shift which occurs in the output signal of the detector-keyer 118 as a result of a phase shift introduced by the resolver 110 and the feedback filter 115 to any change in the *reference* frequency.

In order to derive this corrective voltage the outputs of the flip-flops 84 and 88 are passed through amplifiers 133 to the stators of a resolver 134 which is identical in construction to the resolver 110. The rotor of the resolver 134 is fixed with respect to the stators at an angle which was the result of an initial calibration wherein the rotor is adjusted to produce a zero output voltage to the resistor 132 when the frequency of its input square wave is in exact agreement with the recorded frequency of the reference square wave. The output of the rotor of the resolver 134 is provided to a feedback filter 136 which is identical in construction to the feedback filter 115, through which the output of the rotor 112 is passed. Preferably the resolver 134 and the feedback filter 136 are disposed in close proximity to the resolver 110 and the feedback filter 115, so as to experience similar environmental conditions.

The output of the feedback filter 136 is fed to an amplifier 137 which provides two outputs 180° out of phase with one another to a detector-keyer 138 which has the outputs of the flip-flop 88, passed through amplifiers 89, as its keying input. The output of the detector-keyer 138 is therefore a voltage proportional to any phase shift which has occurred to the 0 degree sine wave as it passes through the resolver 134 and the filter 136 as a consequence of any frequency change in the reference signal due to tape speed variations or "WOW." If no phase shift has occurred, the output of the detector-keyer will be zero and the voltage across the resistor 126 will be the sole source of supply to the servo filter 128. If a phase shift has occurred as a result of the deviation of the frequency of the 0 degree sine wave from the ideal frequency, as a result of recording and playback, the output of the detector-keyer 138 will be a voltage proportional to that deviation, and accordingly will modify the input to the servo filter 128 in such a manner as to correct for the similar error which is occurring in the output of the detector-keyer 118. The output of the detector-keyer 138 is arranged to be of opposite polarity to the true error which will result in the deviation in the output of the detector-keyer 118 from the ideal, so that the ouputs of the detector-keyers 138 and 118 may be algebraically added to arrive at a voltage which does not contain any phase shift deviation.

While the detector-keyers employed in the present invention are not considered to be inventive in themselves, their circuitry is not as well known as that of the other units, with the exception of a composite wave-former 50 and time discriminator 78 which are disclosed in a previously filed application, as noted. Accordingly, the circuitry of the detector-keyer will be described.

Figure 3:
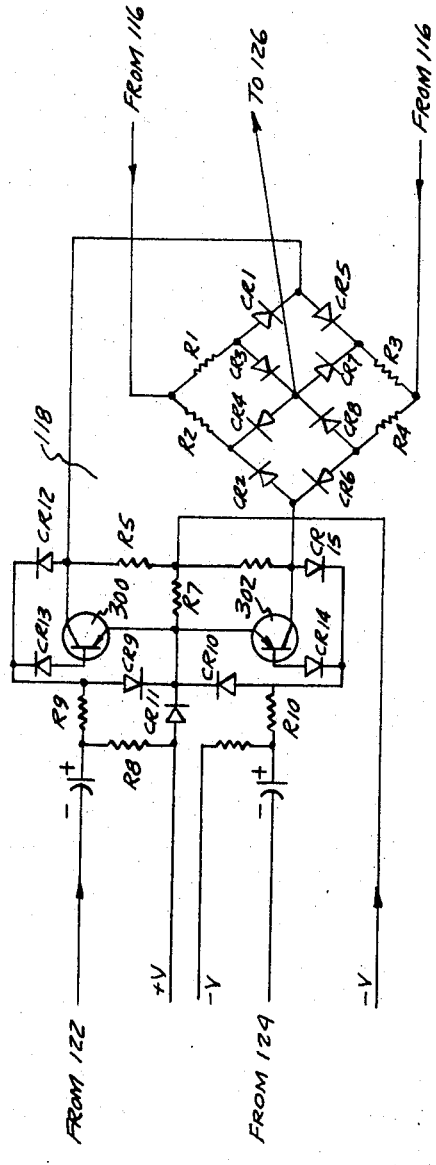
FIGURE 3 is a schematic diagram of the keyer-detector used as a phase demodulator for the compensation signal.

The two detector-keyers 118 and 138 are identical. The circuitry of the detector-keyer 118 is disclosed in FIGURE 3. Essentially, the keyer consists of a pair of transistors 300 and 302 connected in a switching arrangement and controlled by the X command square wave. The transistors switch a diode bridge which has the filtered, amplified and squared rotor signal as its input. If the phase of the command square wave is shifted by 90° with respect to the rotor output, the detector-keyer will provide a symmetrical square wave voltage output which has a zero DC value. The servo filter 128 generates its average value and provides it to servo amplifier 130. If some other phase relationship exists between the command square wave and the rotor square wave, asymmetrical wave will be produced which has a DC average value which is a linear function of the phase displacement.

The transistor 300 essentially amplifies the signal from amplifier 122 and the transistor 302 amplifies the input of amplifier 124. Each amplifier is driven between cutoff and full conduction by its input. The resultant square waves are applied to the diode switching circuit generally indicated at 304. When the key voltage is one direction, it essentially connects one of the squared rotor lines to the output line 126, and when the voltage is in the opposite direction, it connects the opposite one. The resultant square wave is applied to line 126.

Having thus described my invention, I claim:

1. In a control system operative to receive a reference wave form and a command wave form having a phase shift with respect to the reference, such phase shift being proportional to a desired output of said control system, wherein one of said wave forms is provided to a plurality of operating elements in order to derive a control signal, and including means for deriving a control voltage proportional to the deviation of the actual output of the system from the desired output of the system as determined by a comparison of the phases of said reference and command wave forms, apparatus for correcting for phase shift which occurs as a result of the passage of said one wave form through said operating elements, because of departure of said wave from a nominal frequency, comprising: a filter having a frequency versus phase shift characteristic substantially identical to that of said operating elements connected to receive one of said wave forms; means for comparing the phase of the output of said filter with its input; means generating an error voltage having a magnitude proportional to the difference in phase between the output and input of said filter; and means for summing the error voltage with said control voltage in order to provide a corrected control voltage for said system.

2. The control system of claim 1, wherein the operating elements through which one of said wave form is passed includes a first resolver, and the filter through which one of said wave form is passed also includes a second resolver.

3. The control system of claim 1, wherein the operating element through which one of said wave forms is passed includes a resolver, and a third wave form, having a known phase shift with respect to said reference wave form is employed, along with said reference wave form, to energize said resolver.

4. The control system of claim 3, wherein the reference wave form is passed through said filter, and the detector for determining the phase shift of the output of the filter with respect to its input as a result of the deviation of its input from nominal frequency constitutes a detector-keyer having the output of the filter as one of its inputs and the third wave form having a known phase shift with respect to said reference wave form as its second input.

5. In a control system wherein a command wave form and a reference wave form having an instantaneous phase shift with respect to one another proportional to an output desired from the control signal system are recorded and then played back, means for compensating for a frequency shift induced in said waves as a result of the recording and playback process, comprising: means for deriving a signal proportional to the actual position of the control system; means for operating upon the played back reference and command wave forms and the signal representative of the actual position of the control signal to derive a nominal control signal proportional to the deviation of the commanded position of the control system, as derived from the played back command and reference wave forms, from the actual position of the control system; means for passing one of said wave form through a filter which produces a phase shift proportional to the deviation of its input signal from a nominal reference frequency; means for comparing the output of the filter with one of the played back wave forms to produce a voltage proportional to the deviation of the played back wave forms from the nominal frequency; and means for summing the output of said detector with the nominal control signal to develop a corrected control signal.

6. The control system of claim 5, wherein the means for comparing the deviation of the actual position of the control system from the desired position as determined from the played back reference and command wave forms includes a first resolver, and the filter also includes a substantially identical second resolver, whereby the output of the filter provides a voltage which is a function of the phase shift introduced by said first resolver as a result of the deviation of the wave forms from their nominal frequency.

References Cited

UNITED STATES PATENTS 2,922,052 1/1960 Peaslee.
2,937,365 5/1960 Peaslee.
3,156,915 10/1964 Lang et al.
3,241,020 3/1966 Milenkovic.

THOMAS E. LYNCH, Primary Examiner

U.S. Cl. X.R.

235—151.11; 318—28, 448